US009613061B1

(12) United States Patent
Zhou et al.

(10) Patent No.: US 9,613,061 B1
(45) Date of Patent: Apr. 4, 2017

(54) IMAGE SELECTION FOR NEWS SEARCH

(71) Applicant: Google Inc., Mountain View, CA (US)

(72) Inventors: Hong Zhou, Saratoga, CA (US); Srdjan Mitrovic, Redwood City, CA (US); Krishna Bharat, Palo Alto, CA (US); Michael Schmitt, Zurich (CH); Michael Curtiss, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 2 days.

(21) Appl. No.: 14/288,685

(22) Filed: May 28, 2014

Related U.S. Application Data

(63) Continuation of application No. 12/195,167, filed on Aug. 20, 2008, now Pat. No. 8,775,436, which is a continuation of application No. 10/804,180, filed on Mar. 19, 2004, now abandoned.

(51) Int. Cl.
*G06F 17/30* (2006.01)
(52) U.S. Cl.
CPC .. *G06F 17/30268* (2013.01); *G06F 17/30011* (2013.01); *G06F 17/30705* (2013.01)
(58) Field of Classification Search
CPC .................................................. G06F 17/30864
USPC .......... 707/74, 102, 723; 382/100, 165, 209, 382/305, 141; 715/200, 512, 230; 386/332; 348/468
See application file for complete search history.

(56) References Cited

U.S. PATENT DOCUMENTS

| | | | |
|---|---|---|---|
| 5,477,274 A * | 12/1995 | Akiyoshi | H04N 5/44513 348/468 |
| 5,546,572 A | 8/1996 | Seto et al. | |
| 5,832,470 A * | 11/1998 | Morita | G06F 17/3071 |
| 5,886,698 A | 3/1999 | Sciammarella et al. | |
| 5,893,095 A * | 4/1999 | Jain | G06F 17/30256 |
| 5,893,908 A | 4/1999 | Cullen et al. | |
| 5,963,659 A | 10/1999 | Cahill et al. | |
| 5,970,183 A | 10/1999 | Amemiya et al. | |
| 6,169,998 B1 | 1/2001 | Iwasaki et al. | |
| 6,240,424 B1 * | 5/2001 | Hirata | G06F 17/30253 382/305 |

(Continued)

FOREIGN PATENT DOCUMENTS

EP  48568  A2  3/1982

OTHER PUBLICATIONS

Wynblatt et al. ("Web Page Caricatures: Multimedia Summaries for WWW Documents," IEEE Proc. Int'l Conf. on Multimedia Computing and Systems, Jun. 22-Jul. 1, 1998, pp. 194-199).

(Continued)

*Primary Examiner* — Mariela Reyes
*Assistant Examiner* — Thong Vu
(74) *Attorney, Agent, or Firm* — Patent Law Works LLP

(57) ABSTRACT

A system identifies a first document that includes a number of first images, identifies a second document that includes a number of second images, and forms a cluster based on a relationship between the first document and the second document. The system identifies a first caption associated with one of the first images, identifies a second caption associated with one of the second images, selects the one of the first images or the one of the second images as a representative image for the cluster based on the first caption or the second caption, and associates the representative image with the cluster.

19 Claims, 8 Drawing Sheets

(56) References Cited

U.S. PATENT DOCUMENTS

| | | | |
|---|---|---|---|
| 6,636,648 B2 * | 10/2003 | Loui | G06T 11/60 |
| | | | 348/231.2 |
| 6,650,761 B1 * | 11/2003 | Rodriguez | G06F 17/30876 |
| | | | 382/100 |
| 6,922,700 B1 | 7/2005 | Aggarwal et al. | |
| 7,031,968 B2 | 4/2006 | Kremer et al. | |
| 7,099,860 B1 * | 8/2006 | Liu | G06F 17/30256 |
| 7,214,065 B2 | 5/2007 | Fitzsimmons, Jr. | |
| 7,298,930 B1 * | 11/2007 | Erol | G06K 9/00711 |
| | | | 382/305 |
| 7,333,984 B2 | 2/2008 | Oosta | |
| 7,382,903 B2 | 6/2008 | Ray | |
| 7,477,780 B2 * | 1/2009 | Boncyk | 382/165 |
| 7,580,568 B1 | 8/2009 | Wang et al. | |
| 8,775,436 B1 | 7/2014 | Zhou et al. | |
| 2001/0011365 A1 | 8/2001 | Helfman | |
| 2001/0047373 A1 * | 11/2001 | Jones | G06F 3/0481 |
| | | | 715/210 |
| 2002/0038299 A1 | 3/2002 | Zernik et al. | |
| 2002/0091535 A1 * | 7/2002 | Kendall | G06Q 10/02 |
| | | | 705/5 |
| 2002/0107847 A1 | 8/2002 | Johnson | |
| 2003/0046315 A1 | 3/2003 | Feig | |
| 2003/0055810 A1 | 3/2003 | Cragun et al. | |
| 2003/0081931 A1 * | 5/2003 | Nanba | H04N 5/44513 |
| | | | 386/332 |
| 2003/0110181 A1 * | 6/2003 | Schuetze | G06F 17/30713 |
| 2003/0195883 A1 * | 10/2003 | Mojsilovic | G06F 17/30256 |
| 2004/0015517 A1 | 1/2004 | Park et al. | |
| 2004/0019601 A1 | 1/2004 | Gates | |
| 2004/0049734 A1 * | 3/2004 | Simske | G06F 17/30265 |
| | | | 715/230 |
| 2004/0161153 A1 * | 8/2004 | Lindenbaum | G06T 7/0004 |
| | | | 382/209 |
| 2004/0202349 A1 * | 10/2004 | Erol | G06F 17/30256 |
| | | | 382/100 |
| 2005/0022106 A1 | 1/2005 | Kawai et al. | |
| 2005/0050150 A1 | 3/2005 | Dinkin | |
| 2005/0080769 A1 | 4/2005 | Gemmell et al. | |
| 2005/0165743 A1 * | 7/2005 | Bharat | G06F 17/30867 |
| 2006/0004717 A1 | 1/2006 | Ramarathnam et al. | |
| 2007/0098266 A1 * | 5/2007 | Chiu | G06F 17/30265 |
| | | | 382/224 |
| 2009/0076797 A1 | 3/2009 | Yu | |

OTHER PUBLICATIONS

Frankel et al. ("WebSeer: An Image Search Engine for the World Wide Web," The University of Chicago, Computer Science Dept., TR 96-14, Aug. 1, 1996).

Brown et al. ("CWIC: Continuous Web Image Collector," Proceedings of ACM 38$^{th}$ Southwest Regional Conference, 2000, pp. 244-252).

Helfman et al. ("Image Representation for Accessing and Organizing Web Information." Proc. SPIE vol. 4311 (2001)).

Baidu; www.baidu.com; Jun. 21, 2004 (print date); 8 pages.

Hong Zhou et al. "Image Selection for News Search"; U.S. Appl. No. 10/804,180, filed Mar. 19, 2004, 37 pages.

* cited by examiner

FIG. 7

Google News BETA bush |    [ SEARCH NEWS ]

SEARCHED NEWS FOR BUSH

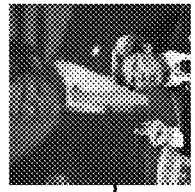 Kerry Assails Bush on National Security — 810
USA Today - 23 hours ago
WASHINGTON - John Kerry leveled broad criticism Monday of President Bush's national security record, claiming Bush had under-funded "those on the front lines . . . .

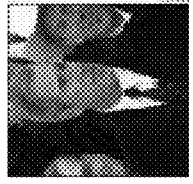 Bush Searches for Pennsylvania Votes — 820
CNN - March 15, 2004
WASHINGTON (AP) -- President Bush, hoping to move Pennsylvania to his win column in this year's election, is reaching out to voters in the state on Monday by . . .

 Kerry: No Apologies — 830
FOX News - March 11, 2004
WASHINGTON -- Senator John Kerry said he won't apologize for remarks he made that angered Republicans and the Bush-Cheney re-election campaign. . . .

IMAGE SELECTION FOR NEWS SEARCH

RELATED APPLICATIONS

This application is a continuation of U.S. patent application Ser. No. 12/195,167, filed Aug. 20, 2008, which is a continuation of U.S. patent application Ser. No. 10/804,180, filed Mar. 19, 2004, the disclosures of which are incorporated herein by reference.

BACKGROUND OF THE INVENTION

Field of the Invention

Systems and methods consistent with the principles of the invention relate generally to information retrieval and, more particularly, to selecting an image to present in connection with search results relating to a news search.

Description of Related Art

The World Wide Web ("web") contains a vast amount of information. Search engines assist users in locating desired portions of this information by cataloging web documents. Typically, in response to a user's request, a search engine returns links to documents relevant to the request.

Search engines may base their determination of the user's interest on search terms (called a search query) provided by the user. The goal of a search engine is to identify links to relevant results based on the search query. Typically, the search engine accomplishes this by matching the terms in the search query to a corpus of pre-stored web documents. Web documents that contain the user's search terms are considered "hits" and are returned to the user.

In the case of news documents, users may find it beneficial to see an image in association with the news documents. Oftentimes, however, news documents include multiple images some of which may not be related to the topic of the news documents. This makes it difficult to automatically select appropriate images for the news documents.

SUMMARY OF THE INVENTION

According to one aspect consistent with the principles of the invention, a method includes identifying images associated with a document, filtering the images to create a set of candidate images, detecting captions associated with the candidate images, and selecting one of the candidate images to associate with the document based on the detected captions.

According to another aspect, a graphical user interface for display on a computer includes a search result comprising a cluster of news documents and an image associated with the cluster.

According to yet another aspect, a graphical user interface for display on a computer includes a search result comprising a news document and an image associated with the news document.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 7 is a diagram of an exemplary graphical user interface that presents search results as a list of clusters according to an implementation consistent with the principles of the invention; and FIG. 8 is a diagram of an exemplary graphical user interface that presents search results as a list of documents according to an implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention.

Overview

Users who search news documents on a network, such as the Internet, may find it beneficial to view images that are associated with the news documents. Systems and methods consistent with the principles of the invention may provide images in association with news documents or clusters of news documents. The systems and methods may select the best image from a group of images to display in connection with a particular news document or cluster.

Exemplary Network Configuration

Figure 1:
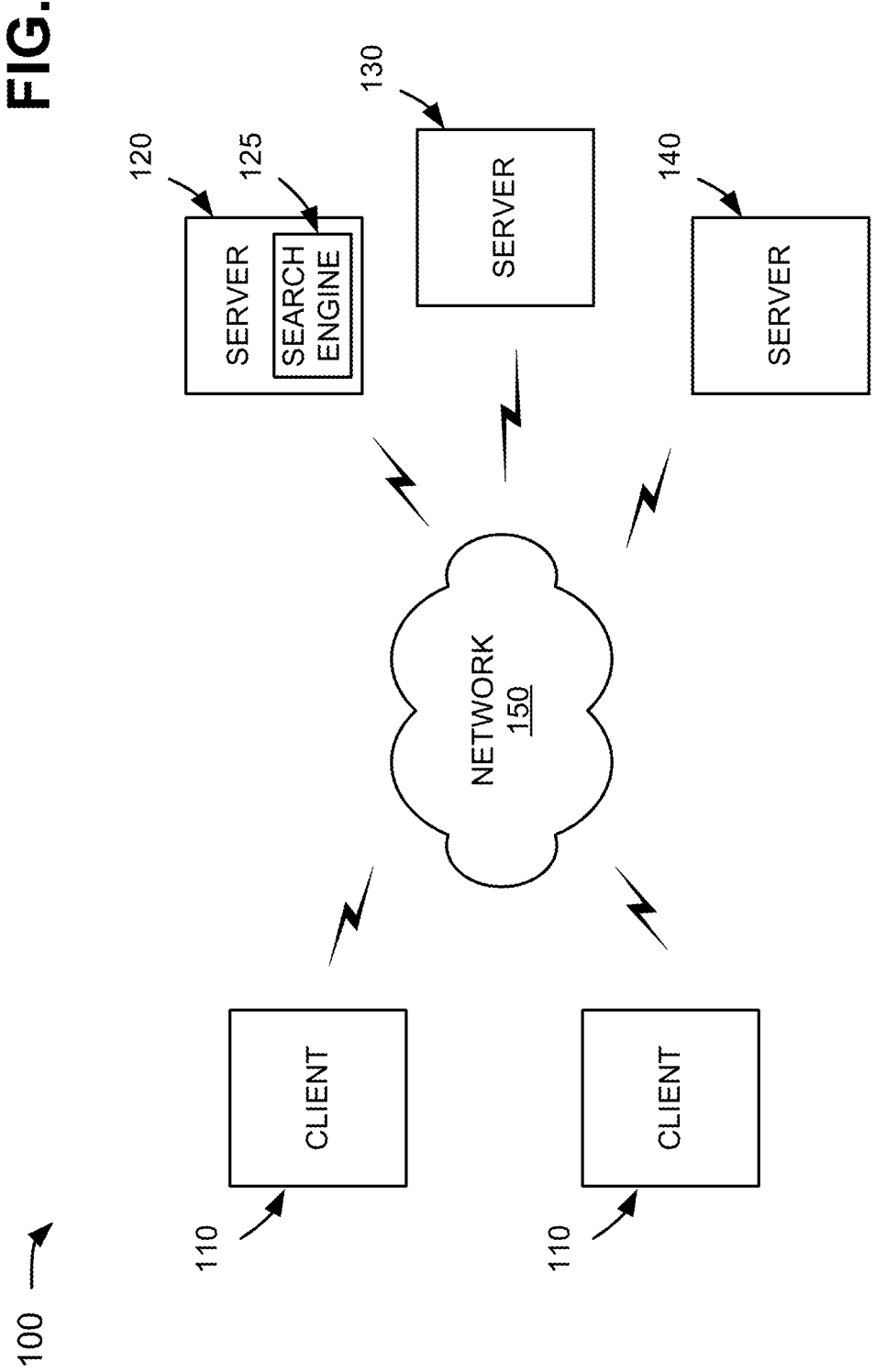
FIG. 1 is a diagram of an exemplary network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to multiple servers 120-140 via a network 150. Network 150 may include a local area network (LAN), a wide area network (WAN), a telephone network, such as the Public Switched Telephone Network (PSTN), an intranet, the Internet, a memory device, another type of network, or a combination of networks. Two clients 110 and three servers 120-140 have been illustrated as connected to network 150 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these devices. Servers 120-140 may include server entities that gather, process, search, and/or maintain documents in a manner consistent with the principles of the invention. Clients 110 and servers 120-140 may connect to network 150 via wired, wireless, and/or optical connections.

In an implementation consistent with the principles of the invention, server 120 may include a search engine 125 usable by clients 110. Server 120 may crawl a corpus of documents (e.g., web pages), index the documents, and store information associated with the documents in a repository of crawled documents. Servers 130 and 140 may store or maintain documents that may be crawled by server 120. While servers 120-140 are shown as separate entities, it may be possible for one or more of servers 120-140 to perform one or more of the functions of another one or more of servers 120-140. For example, it may be possible that two or more of servers 120-140 are implemented as a single server. It may also be possible for a single one of servers 120-140 to be implemented as two or more separate (and possibly distributed) devices.

A "document," as the term is used herein, is to be broadly interpreted to include any machine-readable and machine-storable work product. A document may include, for example, an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "link," as the term is used herein, is to be broadly interpreted to include any reference to or from a document.

Exemplary Client/Server Architecture

Figure 2:
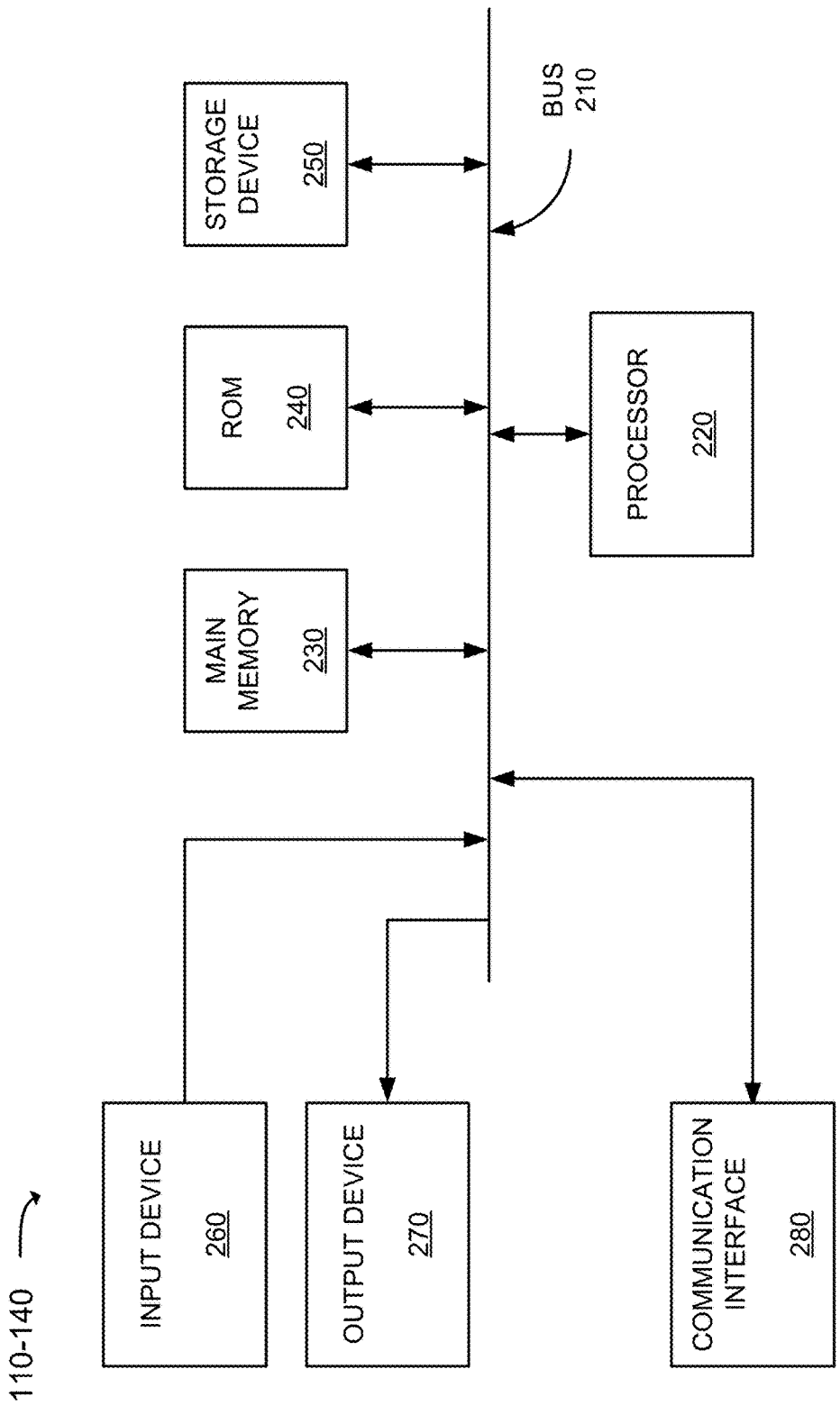
FIG. 2 is an exemplary diagram of a client and/or server of FIG. 1 according to an implementation consistent with the principles of the invention.

FIG. 2 is an exemplary diagram of a client or server entity (hereinafter called "client/server entity"), which may correspond to one or more of clients 110 and servers 120-140, according to an implementation consistent with the principles of the invention. The client/server entity may include a bus 210, a processor 220, a main memory 230, a read only memory (ROM) 240, a storage device 250, an input device 260, an output device 270, and a communication interface 280. Bus 210 may include a set of conductors that permit communication among the elements of the client/server entity.

Processor 220 may include a conventional processor, microprocessor, or processing logic that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device 260 may include a conventional mechanism that permits an operator to input information to the client/server entity, such as a keyboard, a mouse, a pen, voice recognition and/or biometric mechanisms, etc. Output device 270 may include a conventional mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As will be described in detail below, the client/server entity, consistent with the principles of the invention, performs certain searching-related operations. The client/server entity may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Server

Figure 3:
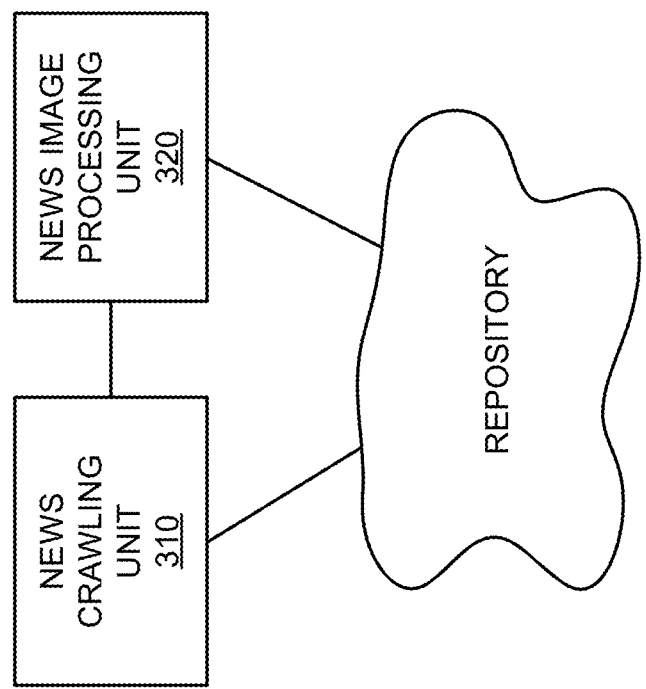
FIG. 3 is an exemplary functional block diagram of a portion of a server of FIG. 1 according to an implementation consistent with the principles of the invention.

FIG. 3 is an exemplary functional block diagram of a portion of server 120 according to an implementation consistent with the principles of the invention. According to one implementation, one or more of the functions described below may be performed by search engine 125. According to another implementation, one or more of these functions may be performed by an entity external to server 120, such as a computer associated with server 120 or one of servers 130 and 140.

Server 120 may include a news crawling unit 310 and a news image processing unit 320 connected to a repository. The repository may include information associated with documents that were crawled and stored by, for example, news crawling unit 310. The repository may also store images associated with these documents either together with the documents or separate therefrom.

News crawling unit 310 may crawl a corpus of documents, such as the Internet, to identify news documents. For example, news crawling unit 310 may start with a set of addresses (e.g., uniform resource locators (URLs)), such as addresses associated with a set of news sources, and parse the documents associated with these addresses to identify links to other documents. News crawling unit 310 may then parse these other documents to identify links to yet other documents, and so on. News crawling unit 310 may use this information to fetch and index the news documents.

News crawling unit 310 may then extract addresses associated with candidate images from each of the crawled documents. For example, news crawling unit 310 may extract addresses (e.g., URLs) of all images from each of the crawled documents. For each image, news crawling unit 310 may store its associated address and other data, such as the image dimension, the parent addresses (e.g., URLs), the date on which the image was crawled, and the date on which the image was last modified. This "other" data may be determined from information, such as hypertext markup language (HTML) tags, in the source document (i.e., the document from which the image originated).

News crawling unit 310 may also crawl the images based on their extracted addresses and store the images and other information relating to the images. For example, news crawling unit 310 may obtain temporal information and reference count information relating to the images. The temporal information may be useful for identifying "stock images" (i.e., images that are used in multiple news documents relating to the same topic). Stock images may qualify as good candidate images. The reference count information may be useful for identifying images that are linked by multiple news documents on the same host but not directly related to the topics of the news documents, such as images of columnists or news source related icons. Images with high reference counts may be determined to not make good candidate images.

News image processing unit 320 may process the images before and/or after the images are crawled by news crawling unit 310. For example, news image processing unit 320 may identify an initial set of candidate images from the images identified by news crawling unit 310. News image processing unit 320 may filter the set of candidate images based on additional information obtained by news crawling unit 310 during the image crawl.

News image processing unit 320 may select an image from the set of candidate images to associate with a particular news document or a particular cluster of news documents. The particular processing involved in selecting an image will be described in detail below. News image processing unit 320 may store an index that relates the candidate images to the news documents to which they have been associated.

Exemplary Image Selection Processing

Figure 4:
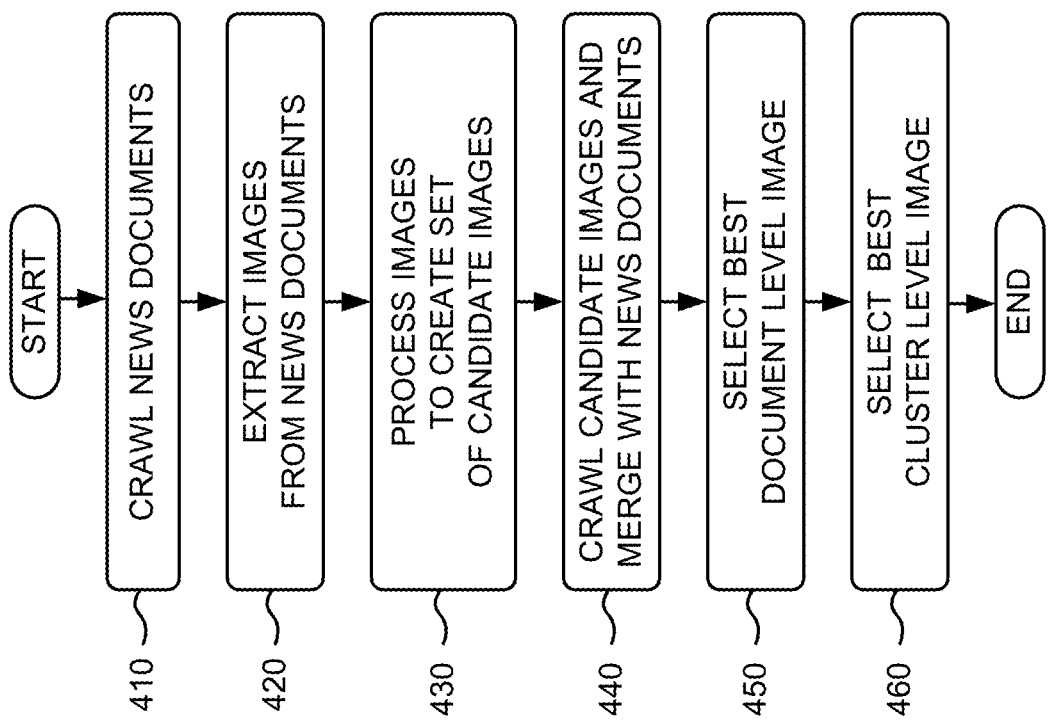
FIG. 4 is a flowchart of exemplary processing for selecting an image according to an implementation consistent with the principles of the invention.

FIG. 4 is a flowchart of exemplary processing for selecting an image according to an implementation consistent with the principles of the invention. Processing may begin with crawling a corpus of documents to identify news documents (act 410). The crawling may start with a set of addresses, such as addresses associated with a set of news sources, and parse the documents associated with these addresses to identify links to other documents. These other documents may then be parsed to identify links to yet other documents, and so on. The news documents may then be fetched and indexed.

Addresses of the images in each of the crawled documents may be identified and extracted (act 420). For each image, the associated address and other data, such as the image dimension, the parent addresses (e.g., URLs), the date on which the image was crawled, and the date on which the image was last modified, may be stored.

Figure 5:
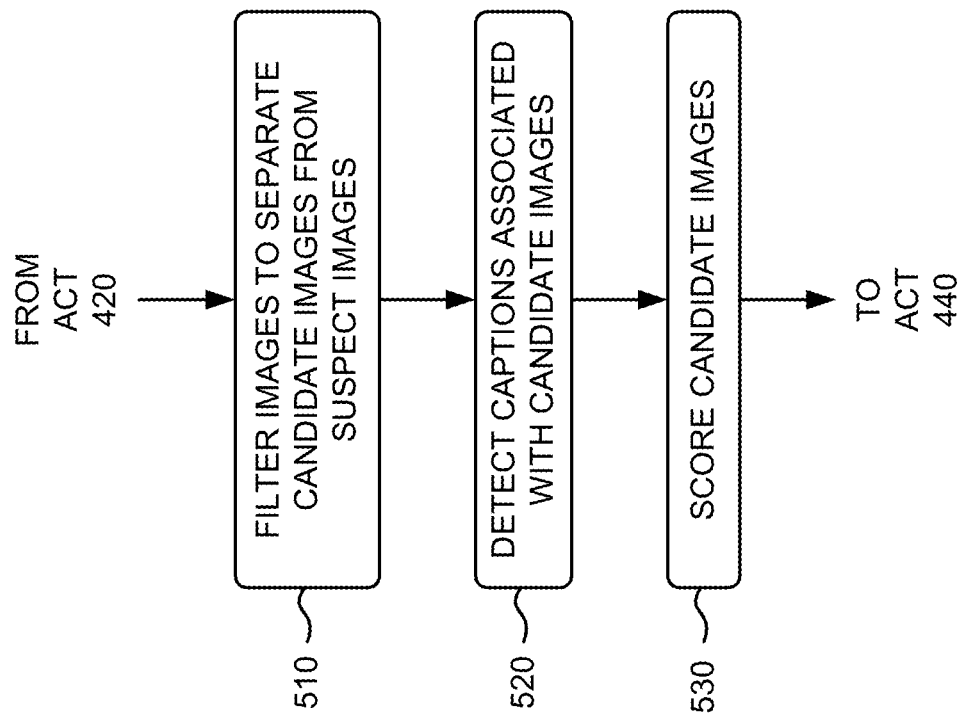
FIG. 5 is a flowchart of exemplary processing to create the set of candidate images according to an implementation consistent with the principles of the invention.

The images may then be processed to create a set of candidate images (act 430). FIG. 5 is a flowchart of exemplary processing to create the set of candidate images according to an implementation consistent with the principles of the invention. Processing may begin with filtering the images to separate images that are good candidates to associate with news documents or clusters from suspect images that are not good candidates to be associated with any news document or cluster. Examples of candidate images may include images relating to a topic of the news documents or clusters. Examples of suspect images may include images corresponding to advertisements or columnists, images that are irregularly shaped, images with an irregular format, and images that are unrelated to the topic of the source news documents. Suspect images may be removed from further processing.

As described below, one or a combination of various filtering rules, criteria and thresholds may be used to select one or more candidate images. It should be appreciated, however, that aspects of the invention are not limited to any one or a combination of these filtering rules, criteria, or thresholds. Those skilled in the art will recognize from this description of exemplary embodiments that various modifications and alternative implementations are possible.

One exemplary filtering rule may separate candidate images from suspect images based on the shape of the images. For example, a candidate image should not have an irregular shape. Both dimensions of the candidate image should exceed a particular threshold (e.g., 60 pixels). An image with a dimension below the threshold may be identified as a suspect image. Also, a candidate image should have a moderate aspect ratio (e.g., no more than 3:1 or 1:3). In other words, the image should not be too narrow or too tall. A threshold may be used to distinguish acceptable from unacceptable aspect ratios. An image with an aspect ratio below the threshold may be identified as a suspect image.

Another exemplary filtering rule may separate candidate images from suspect images based on their file formats. For example, a candidate image should have a proper image file format, such as the joint photographic experts group (jpeg) format, graphic interchange format (gif) format, tagged image file format (tiff) format, portable document format (pdf) format, bitmap (bmp) format, portable network graphics (png) format, and possibly other common image formats. Images that include formats that are not considered proper image file formats may be identified as suspect images.

Yet another exemplary filtering rule may separate candidate images from suspect images based on whether they include links. For example, a candidate image should not include a link, such that if the image is clicked it will lead to a document with which it is associated. Images that include links are often advertisements and, therefore, may be identified as suspect images.

A further exemplary filtering rule may separate candidate images from suspect images based on where the images are hosted. For example, a candidate image should be hosted by the same organization that hosted the source news document. Images from different domains (e.g., cnn.cojp.com), but associated with the same organization (e.g., cnn.com), may be identified as candidate images. Images from other organizations tend to be advertisements and, therefore, may be identified as suspect images.

There may be exceptions to these rules. Accordingly, good and bad lists may be formed. The good list may include information regarding images from third party cache services, such as Akamai, that may have file formats that are not considered proper file formats and images that include a link (or perhaps sources for which images with a link may be accepted). Images associated with the good list may be identified as candidate images. The bad list may include information regarding news sources that do not want their images shown and suspect images that have, for one reason or another, been previously identified as candidate images.

Image captions associated with the candidate images may be detected (act 520). An image caption may provide the best description of an image. It may also indicate whether the image is related to the topic of the source news document.

When parsing the news documents, information regarding the content of the news documents and the images may be recorded. For example, in the case of HTML documents, runs of continuous text within HTML tags may be collected together and called "text runs." Each text run and each image may be labeled with the associated HTML table identifier and the HTML table cell identifier, if applicable. In addition, the alternative text for each image may also be recorded. The alternative text for an image may provide a textual alternative to the purpose of the image and may be displayed when the image is not being displayed.

For each image, the alternative text, when present, may be examined. The alternative text may be analyzed to determine whether it contains "poison" words, such as words identifying the author of the image or other words unrelated to the topic of the corresponding news document. When the alternative text does not contain poison words, it may be used as the caption of the image.

When the image does not include alternative text or it is determined that the alternative text should not be used as the image caption, it may be determined whether the image is located within a table. If the image is not located in a table, then the image may be identified as having no image caption because of the ambiguity between the image caption and the body of the news document. If the image is located in a table, however, then the text runs that are within the same table cell as the image may be considered as a candidate for the image caption. If there are no text runs within the same table cell as the image, then the text runs in the neighboring table cell (within a certain cell distance) may be considered as a candidate for the image caption.

When determining whether to use an image caption candidate as the image caption, it may be determined whether the number of candidate text runs exceeds a threshold. For example, when the number of candidate text runs exceeds the threshold, there is a chance that these text runs are not associated with the image, but instead are part of the body of the news document. In this case, the text runs may not be used as the image caption.

It may also be determined whether the candidate text runs are too bulky. For example, the average length of the text runs and/or the largest length of the text runs may be analyzed to determine whether they are below a certain threshold. When the average length of the text runs and/or the largest length of the text runs exceed the threshold, there is a chance that these text runs are not associated with the image, but instead are part of the body of the news document. In this case, the text runs may not be used as the image caption.

An image score may be generated for each candidate image (act 530). In one implementation, the score is based on one or more factors from the group including the image size, a distance to the title of the news document, and an overlap between the image caption and the news document centroid (i.e., the collection of words most representative of the news document).

With regard to the first factor, the relative size of an image in terms of area with respect to the largest image size for the same source document may be determined and used as a scoring factor. For an HTML document, the image size may be determined from the "img" tag associated with the image. If there is no img tag in the document, then the image may receive a zero score for this factor. With regard to the second factor, the distance from the title of the document to the image may be determined. The larger this distance is the more likely that the image is not related to the topic of the document. With regard to the third factor, it may be determined how many times the words in the image caption appear in the body of the document. The more hits the image caption has in the body of the document, the more likely that the image is related to a topic of the document. In other implementations, other techniques may be used to determine whether the image caption is related to a topic of the document.

In one implementation, these factors are used to generate a score for an image. According to one exemplary implementation, an image score may be determined as follows:

$$\text{Image Score}=C\_size*(\text{relative size of the image})+ C\_title\_distance/(\text{distance from title})+C\_centroid\_hit*(\text{number of document centroid hits}),$$

where C_size may refer to a coefficient associated with the size factor, C_title_distance may refer to a coefficient associated with the distance-from-title factor, and C_centroid_hit may refer to a coefficient associated with the centroid hit factor.

The candidate images may be stored in a log file with their corresponding source documents. In one implementation, the candidate images are sorted by their scores in descending order. This log file may permit the images that are later returned by a crawl to be merged with their corresponding source documents.

Returning to FIG. 4, the addresses of the candidate images may be used to crawl the images (act 440). For example, the candidate images may be fetched and merged with their corresponding source documents in the log file (act 440).

The best document level image may then be selected (act 450). According to one implementation, the best document level image is selected after the crawl because some candidate images may not be reachable and dimension information may not be known for some candidate images prior to the crawl. Unreachable candidate images may be discarded. For example, a predefined timeout period may be set for the image crawl. If a candidate image is unreachable at the end of this timeout period, then it may be discarded.

The dimension of each candidate image that was successfully fetched during the crawl may be analyzed again. A candidate image that has an irregular shape may be discarded. As described above, both dimensions of the candidate image should exceed a particular threshold (e.g., 60 pixels). A candidate image with a dimension below the threshold may be discarded. Also, a candidate image that does not have a moderate aspect ratio (e.g., no more than 3:1 or 1:3) may be discarded. In other words, the candidate image should not be too narrow or too tall. As described above, a threshold may be used to distinguish acceptable from unacceptable aspect ratios. A candidate image with an aspect ratio below the threshold may be discarded.

An image histogram of reference counts may also be constructed to filter out columnist images and news source related icons. The histogram may be useful for identifying images that are linked by multiple news documents on the same host but not directly related to the topics of the news documents, such as columnist images and news source related icons. Candidate images with high reference counts may be discarded.

Additional filtering rules may be used to further filter the candidate images. For example, candidate images that contain text may be discarded. Candidate images that look more like clip-art, as opposed to photographs, may be discarded. Candidate images that are all the same color may be discarded. Other criteria may alternatively be used to filter out bad images.

The best document level image may be selected as the highest scoring candidate image of the remaining candidate images associated with a news document.

The best cluster level image may then be selected (act 460). A cluster is a collection of news documents relating to the same topic. Within a cluster, there might be multiple news documents that include images. According to one implementation, the best cluster level image may be determined based on the rank of the source news document within the cluster. For example, the higher the news document is ranked within the cluster, the more likely its image may be representative of the cluster.

The best cluster level image may also, or alternatively, be determined based on an overlap of an image caption and the cluster centroid. For example, it may be determined how many times the words in the image caption appear in the body of the documents in the cluster. The more hits the image caption has in the body of the documents, the more likely that the image is related to the topic of the cluster.

In one implementation, the rank of the source news document may be one factor and the amount of overlap between the image caption and cluster centroid may be another factor in generating an overall score for an image. In other implementations, one of these factors may be weighted more heavily than the other. In yet other implementations, other factors may also be considered in generating the overall score.

Exemplary Query Processing

Figure 6:
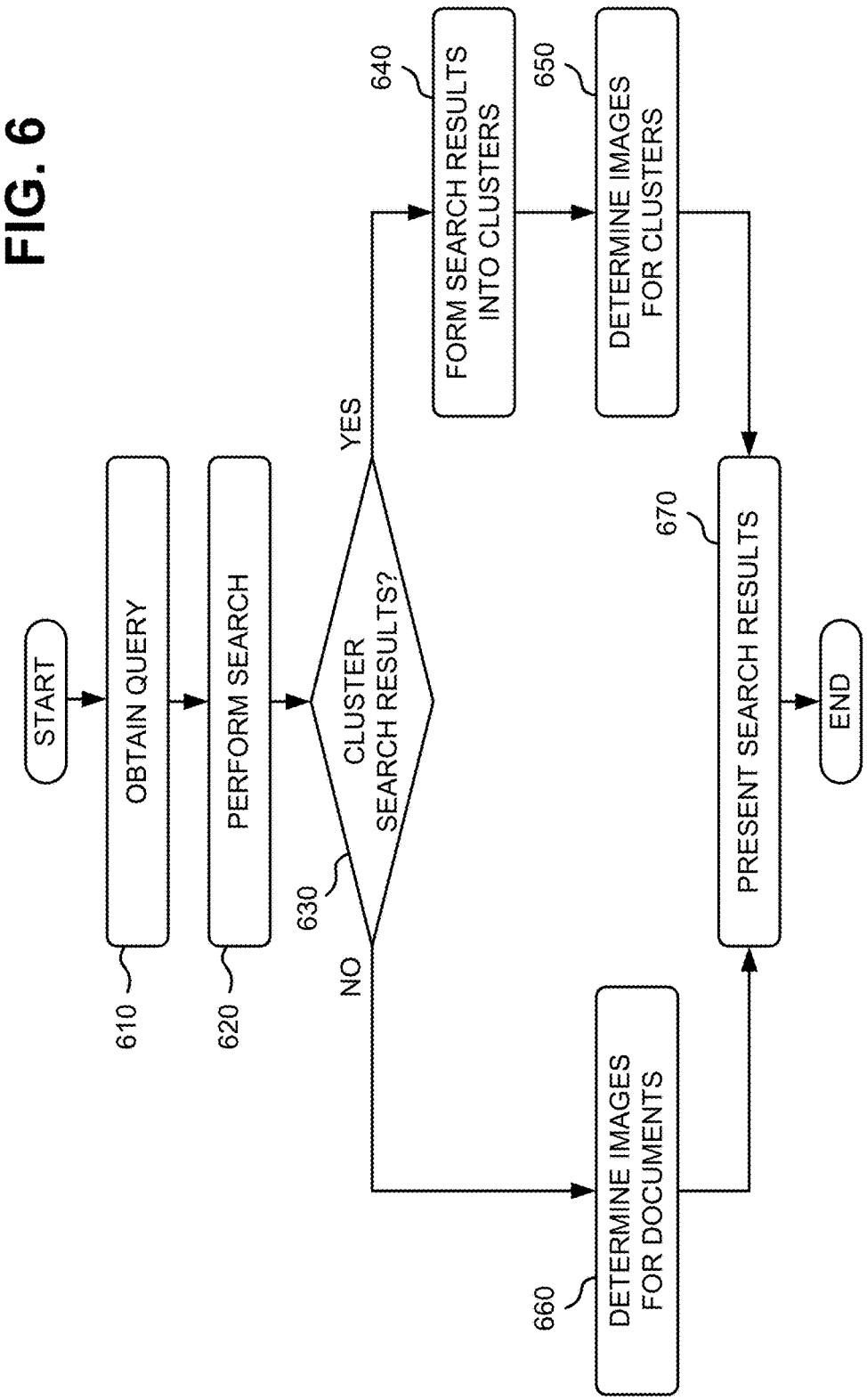
FIG. 6 is a flowchart of exemplary processing for providing search results according to an implementation consistent with the principles of the invention.

FIG. 6 is a flowchart of exemplary processing for providing search results according to an implementation consistent with the principles of the invention. Processing may begin with receiving a search query from a user (act 610). For example, a user may use conventional web browser software to access a search engine, such as search engine 125 of server 120 (FIG. 1). The user may then enter the search query via a graphical user interface provided by search engine 125. Assume that the search query includes a term relating to a news search.

A search may then be performed to identify news documents that are relevant to the search query (act 620). For example, a corpus or repository of news documents may be examined to identify news documents that include a term of the search query. The news documents may then be ranked according to one or more conventional ranking factors.

It may then be determined whether to present the search results as a list of news documents or as a list of clusters of news documents (act 630). This determination may be pre-established by search engine 125. For example, the search results may always initially be presented as a list of news documents or a list of clusters. The user may then be given the option of having the search results presented another way. Alternatively, the user may initially be given the option of specifying how the search results will be presented.

If the search results are to be presented as a list of clusters, the news documents (of the search results) may be formed into one or more clusters according to the topics to which they relate (act 640). Techniques for forming related documents into clusters are known in the art and, therefore, will not be discussed further. The clusters may then be ranked according to one or more conventional ranking factors. Images for the clusters may then be determined (act 650), as described above. If the search results are to be presented as a list of documents, images for the documents may be determined (act 660), as also described above.

The search results may then be presented to the user via a graphical user interface (act 670). For example, the search results may be presented as a list of links to news documents with their associated images. Alternatively, the search results may be presented as a list of clusters of news documents with their associated images.

Exemplary Graphical User Interfaces

Figure 7:
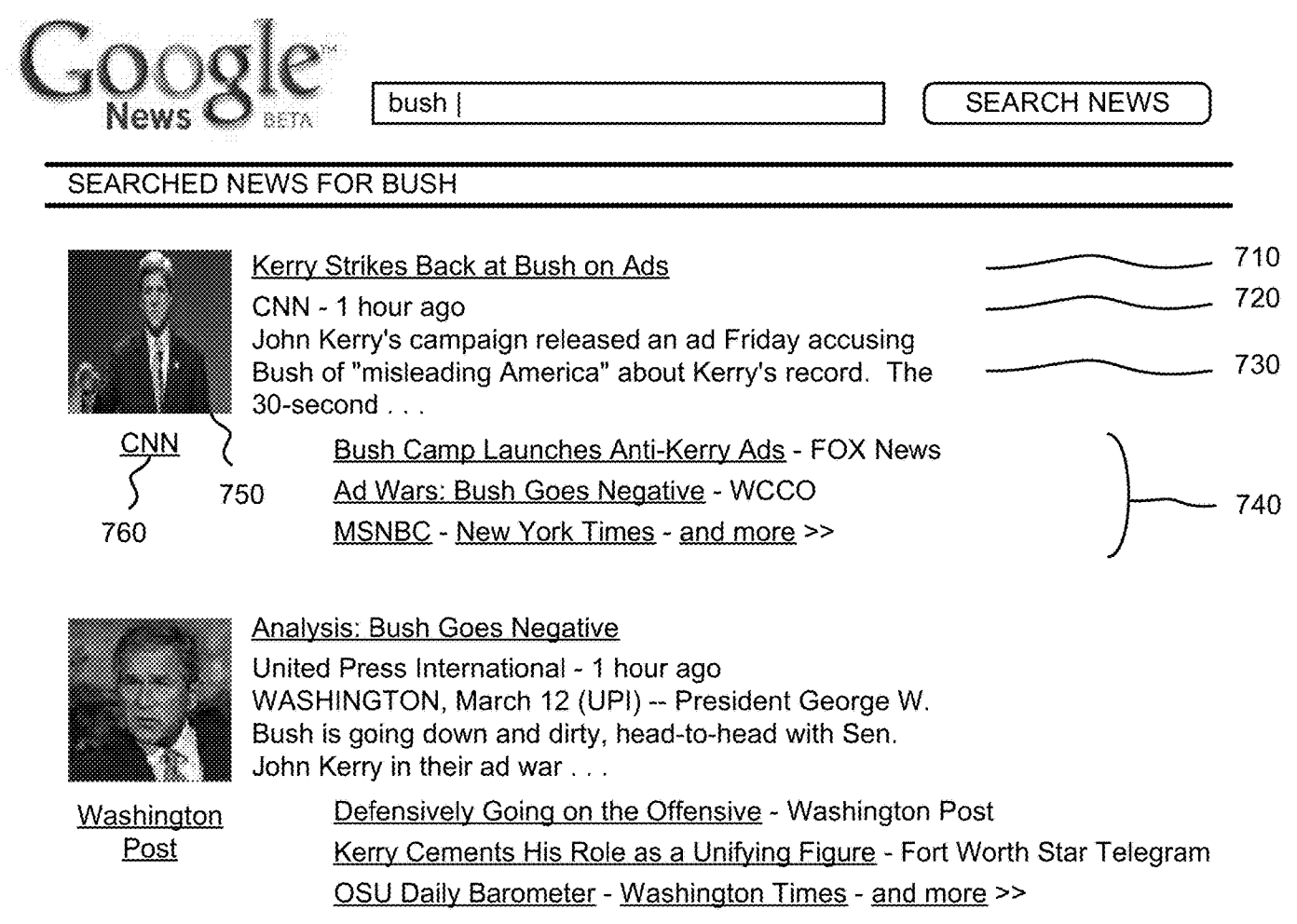

FIG. 7 is a diagram of an exemplary graphical user interface that presents search results as a list of clusters according to an implementation consistent with the principles of the invention. As shown in FIG. 7, a user may enter a search query via a graphical user interface associated with a search engine, such as search engine 125 (FIG. 1). In this example, the user enters the search query "bush."

Search engine 125 may perform a search of a repository or corpus for news documents that are relevant to the search query. There are many ways to determine document relevancy. For example, documents that contain one or more of the search terms of the search query may be identified as relevant. Documents that include a greater number of the search terms may be identified as more relevant than documents that include a fewer number of the search terms.

Search engine 125 may then present the relevant news documents to the user as clusters. As shown in FIG. 7, each cluster may include a link 710 to a corresponding news document, a news source identifier along with an indicator of when the document was created 720, and a brief description 730 of the corresponding document. The cluster may also include links 740 to other documents in the cluster that are related to a topic of the document associated with link 710.

As further shown in FIG. 7, an image 750 may be presented alongside the cluster. Image 750 may be identified, as described above, and presented with an optional descriptor 760 of the source of image 750. In the example of FIG. 7, descriptor 760 identifies CNN as the source of image 750. In one implementation, image 750 is a selectable object—meaning that the user may select the image and be directed to the source document (i.e., the document from which the image originated) or the domain associated with the news source (e.g., cnn.com).

FIG. 8 is a diagram of an exemplary graphical user interface that presents search results as a list of documents according to an implementation consistent with the principles of the invention. As shown in FIG. 8, a user may enter a search query via a graphical user interface associated with a search engine, such as search engine 125 (FIG. 1). In this example, the user enters the search query "bush."

Search engine 125 may perform a search of a repository or corpus for news documents that are relevant to the search query. Search engine 125 may then present the relevant news documents to the user as a list of documents. As shown in FIG. 8, each search result may include a link 810 to a corresponding news document, a news source identifier along with an indicator of when the document was created 820, and a brief description 830 of the corresponding document.

As further shown in FIG. 8, an image 850 may be presented alongside the search result. Image 850 may be identified, as described above. In one implementation, image 850 is a selectable object—meaning that the user may select the image and be directed to the document associated with link 810 or the domain associated with the news source (e.g., usatoday.com).

CONCLUSION

Systems and methods consistent with the principles of the invention may present relevant images in association with news documents and clusters of news documents.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 4-6, the order of the acts may be modified in other implementations consistent with the principles of the invention. Further, non-dependent acts may be performed in parallel.

In one implementation, server 120 may perform most, if not all, of the acts described with regard to the processing of FIGS. 4-6. In another implementation consistent with the principles of the invention, one or more, or all, of the acts may be performed by another entity, such as another server 130 and/or 140 or client 110.

Further, while described in the context of news searches, systems and methods consistent with the principles of the invention may be applicable to non-news searches, such as product searches.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   identifying, by one or more processors, a plurality of images associated with a plurality of documents;
   determining, by the one or more processors, shapes of the plurality of images;
   creating, by the one or more processors, a set of candidate images, from the plurality of images, based on the shapes of the plurality of images and whether there are links associated with the plurality of images;
   identifying, by the one or more processors, a caption associated with a candidate image of the set of candidate images and a number of times that words in the caption appear in bodies of the plurality of documents;
   determining, by the one or more processors, a score for the candidate image in the set of candidate images based on distances between the candidate image and topics associated with the plurality of documents, and overlaps between the caption and the topics associated with the plurality of documents, wherein the overlaps are indicated by the identified number of times;
   selecting, by the one or more processors, a representative image, from the set of candidate images, based on the score determined for the set of candidate images; and
   associating, by the one or more processors, the representative image with the plurality of documents.

2. The method of claim 1, further comprising:
   identifying the plurality of documents based on addresses associated with news sources.

3. The method of claim 1, where creating the set of candidate images comprises:
   identifying one or more particular shapes, of the shapes, that do not satisfy one or more criteria,
   identifying one or more images, of the plurality of images, that are associated with the one or more particular shapes, and
   creating the set of candidate images by including, in the set of candidate images, particular images, of the plurality of images, that are different from the one or more images.

4. The method of claim 3, where identifying the one or more particular shapes that do not satisfy the one or more criteria comprises:
   determining a first dimension of a particular shape of the one or more particular shapes,
   determining a second dimension of the particular shape of the one or more particular shapes,
   determining that at least one of the first dimension or the second dimension does not satisfy a particular threshold, and
   identifying that the particular shape does not satisfy a particular criterion, of the one or more criteria, based on determining that the at least one of the first dimension or the second dimension does not satisfy the particular threshold.

5. The method of claim 3, where identifying the one or more particular shapes that do not satisfy the one or more criteria comprises:
   determining an aspect ratio of a particular shape of the one or more particular shapes,
   determining that the aspect ratio does not satisfy a particular threshold, and
   identifying that the particular shape does not satisfy a particular criterion, of the one or more criteria, based on determining that the aspect ratio does not satisfy the particular threshold.

6. The method of claim 1, further comprising:
   determining file formats of the plurality of images, and
   where creating the set of candidate images comprises:
      creating the set of candidate images based on the shapes of the plurality of images, whether there are links associated with the plurality of images, and the file formats of the plurality of images.

7. The method of claim 1, where determining the score for the candidate image in the set of candidate images comprises:
   determining a size of the candidate image, and
   determining the score for the candidate image based on the size of the candidate image.

8. The method of claim 7, where determining the size of the candidate image comprises:
   identifying a hypertext markup language (HTML) tag associated with the candidate image, and
   determining the size of the candidate image based on the HTML tag.

9. A device comprising:
   one or more processors to:
      identify candidate images for a plurality of documents based on shapes of a plurality of images associated with the plurality of documents and whether there are links associated with the plurality of images;
      determine text that is associated with the candidate images;
      determine a quantity of the text that does not exceed a threshold;
      determine an average length of the text;

determine that the text is a caption for a candidate image, of the candidate images, based on the quantity of the text and the average length of the text;

select the candidate image, from the candidate images, as a representative image based on overlaps between the caption and topics associated with the plurality of documents, wherein the overlaps are indicated by a number of times that words in the caption appear in bodies of the plurality of documents; and associate the representative image with the plurality of documents.

10. The device of claim 9, where the quantity of the text is a number of text runs associated with the candidate image, and where, when determining that the text is the caption for the candidate image, the one or more processors are to:

determine that the number of text runs does not exceed the threshold, and determine that the text is the caption for the candidate image based on determining that the number of text runs does not exceed the threshold and based on the average length of the text.

11. The device of claim 9, where the one or more processors are further to:

determine alternative text for the candidate image;

determine that the alternative text includes particular words; and determine, based on determining that the text includes the particular words, that the alternative text is not to be used as the caption for the candidate image before determining that the text is the caption for the candidate image.

12. The device of claim 9, where, when determining the text, the one or more processors are further to:

determine that the candidate image is located within a table, and identify the text within the table.

13. The device of claim 9, where the one or more processors are further to:

identify the plurality of images associated with the plurality of documents, and determine the shapes of the plurality of images.

14. The device of claim 9, where, when selecting the candidate image, the one or more processors are to:

determine a score for the candidate image based on the caption, and select the candidate image as the representative image for the plurality of documents based on the score.

15. The device of claim 14, where, when determining the score for the candidate image, the one or more processors are to:

determine a collection of words that are representative of a document, of the plurality of documents, that is associated with the caption, determine an overlap between the collection of words and the caption, and determine the score for the image based on the overlap.

16. A non-transitory computer-readable medium storing instructions, the instructions comprising:

one or more instructions that, when executed by at least one processor, cause the at least one processor to:

identify a plurality of documents;

identify a plurality of images associated with the plurality of documents;

determine shapes of the plurality of image;

create a set of candidate images, from the plurality of images, based on the shapes of the plurality of images and whether there are links associated with the plurality of images;

identify a caption associated with a candidate image of the set of candidate images and a number of times that words in the caption appear in bodies of the plurality of documents;

determine a score for the candidate image in the set of candidate images based on distances between the candidate image and topics associated with the plurality of documents, and overlaps between the caption and the topics associated with the plurality of documents, wherein the overlaps are indicated by the identified number of times;

select a representative image, from the set of candidate images, based on the score determined for the set of candidate images; and associate the representative image with the plurality of documents.

17. The non-transitory computer-readable medium of claim 16, where the one or more instructions to create the set of candidate images comprise:

one or more instructions that, when executed by the at least one processor, cause the at least one processor to:

identify, from the plurality of images, stock images that are used in multiple documents related to a same topic, and where creating the set of candidate images, from the plurality of images, is also based on whether an image is a stock image.

18. The non-transitory computer-readable medium of claim 16, where the one or more instructions to select the representative image comprise:

one or more instructions that, when executed by the at least one processor, cause the at least one processor to:

determine whether a particular shape, of the shapes that are associated with the representative image, satisfies one or more criteria, and select the representative image based on determining that the particular shape satisfies the one or more criteria.

19. The non-transitory computer-readable medium of claim 16, where the one or more instructions to create the set of candidate images comprise:

one or more instructions that, when executed by the at least one processor, cause the at least one processor to:

determine file formats of the plurality of images, and create the set of candidate images based on the file formats of the plurality of images.

* * * * *